(12) United States Patent
Liu

(10) Patent No.: US 9,434,147 B2
(45) Date of Patent: Sep. 6, 2016

(54) ENVIRONMENTAL ENGINEERED WOOD LAMINATE FLOORING MANUFACTURING METHOD

(75) Inventor: Binbin Liu, Changsha (CN)

(73) Assignee: Zhejiang Lingge Wood Co., Ltd., Zhejiang (CN)

( * ) Notice: Subject to any disclaimer, the term of this patent is extended or adjusted under 35 U.S.C. 154(b) by 0 days.

(21) Appl. No.: 13/634,400

(22) PCT Filed: Jul. 1, 2011

(86) PCT No.: PCT/CN2011/076744
§ 371 (c)(1),
(2), (4) Date: Sep. 12, 2012

(87) PCT Pub. No.: WO2012/000451
PCT Pub. Date: Jan. 5, 2012

(65) Prior Publication Data
US 2013/0092315 A1    Apr. 18, 2013

(30) Foreign Application Priority Data
Jul. 1, 2010 (CN) .......................... 2010 1 0215063

(51) Int. Cl.
*B32B 37/00* (2006.01)
*B32B 37/16* (2006.01)
(Continued)

(52) U.S. Cl.
CPC ............ *B32B 37/16* (2013.01); *B29D 99/0014* (2013.01); *E04F 15/042* (2013.01); *E04F 15/102* (2013.01)

(58) Field of Classification Search
CPC ..... B32B 37/16; E04F 15/042; E04F 15/102
USPC ....... 156/60, 61, 307.1, 307.3, 307.4, 307.5, 156/307.7
See application file for complete search history.

(56) References Cited

U.S. PATENT DOCUMENTS 5,466,511 A * 11/1995 O'Dell et al. ................ 428/207
6,667,108 B2 * 12/2003 Ellstrom .................... 428/537.1
(Continued)

FOREIGN PATENT DOCUMENTS

CN    2495734       6/2002
CN    2525152 Y    12/2002
(Continued)

OTHER PUBLICATIONS

Bobs Carpet and Tile, Jun. 14, 2010, http://www.bobscarpetandtile.com/laminate_flooring.*
(Continued)

*Primary Examiner* — John Goff
(74) *Attorney, Agent, or Firm* — Ohlandt, Greeley, Ruggiero & Perle, LLP

(57) ABSTRACT

An environmental engineered wood laminate flooring manufacturing method comprising the following: using a wood veneer layer as the top layer, adhering on the wood veneer layer a wear layer, and pressing on the bottom surface of the wood veneer layer a layer of glue-soaked paper, so as to accentuate the clear and natural wood lines on the wood veneer layer; using a high density board as a base board layer, and adhering on the bottom surface thereof a balancing layer; stacking the wood veneer layer, the wear layer, the glue-soaked paper, the base board layer, and the balancing layer; heat pressing with a heat press at a temperature between 170 and 190° C., at a pressure between 16 and 22 Mpa, and for 20 to 50 s. Corresponding tongues and grooves are provided on the four lateral faces of the manufactured flooring.

3 Claims, 1 Drawing Sheet

(51) Int. Cl.
*B29D 99/00* (2010.01)
*E04F 15/04* (2006.01)
*E04F 15/10* (2006.01)

(56) References Cited

U.S. PATENT DOCUMENTS

| | | | |
|---|---|---|---|
| 7,732,057 B2 * | 6/2010 | Stokes et al. | 428/537.5 |
| 2002/0100231 A1 * | 8/2002 | Miller et al. | 52/177 |
| 2007/0251030 A1 * | 11/2007 | Oberholzer | 8/536 |
| 2008/0017307 A1 * | 1/2008 | Ong et al. | 156/307.1 |
| 2008/0268273 A1 * | 10/2008 | O'Brien et al. | 428/528 |

FOREIGN PATENT DOCUMENTS

| | | |
|---|---|---|
| CN | 2714695 | 8/2005 |
| CN | 201031489 | 3/2008 |
| CN | 101200973 | 6/2008 |
| CN | 201103219 | 8/2008 |
| CN | 101881074 | 11/2010 |
| CN | 201679203 U | 12/2010 |
| CN | 201883649 U | 6/2011 |
| JP | 2003001605 A * | 1/2003 |

OTHER PUBLICATIONS

Technical Bulletin—Armor Protective Packing; Apr. 19, 2010; http://internusaindonesia.com/doc/armor_wrap_technical_bulletin_111_color_variation.pdf.* http://web.archive.org/web/20090818000411/http://www.armstrong.com/flooring/hardwood/cabreuva-natural-cabreuva-3-1-2-in-engineered-hardwood-plank-CA422NA/floor-75778.asp; Aug. 18, 2009.*

Machine translation of JP 2003001605 date uknown.*

International Search Report dated Oct. 13, 2011 for PCT application No. PCT/CN2011/076744.

* cited by examiner

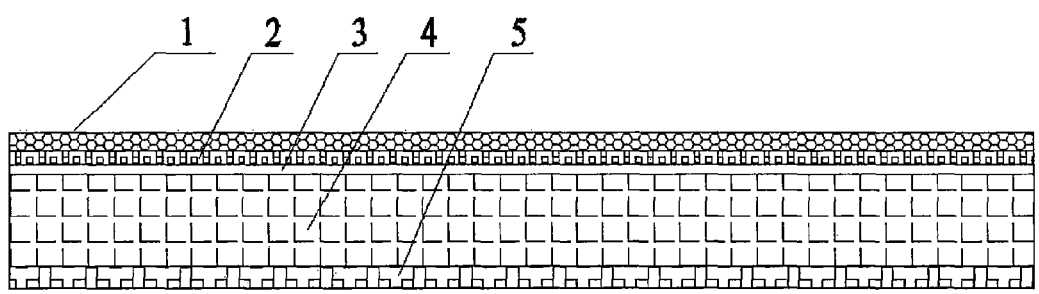

ENVIRONMENTAL ENGINEERED WOOD LAMINATE FLOORING MANUFACTURING METHOD

CROSS REFERENCE TO RELATED APPLICATIONS

The present application claims priority to Chinese patent application No. 201010215063.0, filed on Jun. 1, 2010, and entitled "NOVEL ENVIRONMENT ENGINEERED WOOD LAMINATE FLOORING MANUFACTURING METHOD", the entire disclosure of which is incorporated herein by reference.

FIELD OF THE DISCLOSURE

The present disclosure generally relates to flooring manufacturing technology, and more particularly, to a method for manufacturing a novel environmental wood laminate flooring.

BACKGROUND OF THE DISCLOSURE

With the living standards rising, more people prefer to live in an environment in close touch with nature, such as buildings in decoration with a real natural beauty. Therefore, solid wood flooring is popular in ground decoration, which dramatically reduces forest resources in the earth, negatively influences the ecological balance, and further destroys the living environment of mankind. Besides, floorings made of solid wood have disadvantages like easy deformation, poor wear-resistance and complexity in installation processes where keel splints are needed. Nowadays, there are many kinds of laminate floorings in the market. However, these laminate floorings lack natural texture of the solid wood.

BRIEF SUMMARY OF THE DISCLOSURE

One object of the present disclosure is to provide a method for forming a novel environmental wood laminate flooring.

To achieve the object, one embodiment of the present disclosure provides:

a method for forming a novel environmental wood laminate flooring, including:

(1) Providing a wood veneer layer as a top layer, a top surface of which adhered with a wear-resistant layer, a bottom surface of which pressed with a layer of glue-soaked paper is pressed dip-dyed into variety colors to accentuate the clear and natural wood lines on the wood veneer layer, where the wear-resistant layer, the wood veneer layer and the glue-soaked paper are stacked successively from top to bottom;

(2) Providing a high density board as a base board layer, where the high density board has a thickness ranging from about 6 mm to about 20 mm, and a bottom surface of which is adhered with a balance layer;

(3) Stacking a stack formed in step (1) and a stack formed in step (2) successively from top to bottom, and heat pressing the stacks with a heat pressing machine at a temperature ranging from about 170° C. to about 190° C. and under a pressure ranging from about 16 Mpa to about 22 Mpa, wherein the pressure is kept for a period from about 20 s to about 50 s, so that a flooring is preliminarily formed; and (4) Configuring corresponding tongues and grooves on four lateral faces of the flooring formed in step (3), where floorings may be attached together with the corresponding tongues and grooves.

Optionally, the wood veneer layer is made of solid wood, having a thickness ranging from about 0.05 mm to about 0.3 mm and being translucent.

Optionally, the glue-socked paper is a kind of glue-made paper having different shades of colors.

Optionally, the high density board is a fiberboard.

Optionally, the heat pressing is performed at a temperature of about 175° C. and under a pressure of about 20 Mpa, and the pressure is kept for a period of about 30 seconds.

Embodiments of the present disclosure have following advantages:

Manufacturing of the flooring asserts a simple process. The floorings manufactured by the embodiments are firm and durable as featured the laminate floorings and have the beauty and texture of solid wood flooring as well, which saves a lot of solid wood resources and beneficial for environment protection.

BRIEF DESCRIPTION OF THE DRAWINGS

FIG. 1 is a schematic cross-sectional view of a flooring formed by a method according to one embodiment of the present disclosure.

DETAILED DESCRIPTION OF THE DISCLOSURE

In order to clarify the technical features, characteristics, objects and advantages of the disclosure, exemplary embodiments of the disclosure will be interpreted in detail in combination with the accompanied drawing.

Exemplary Embodiment 1

Referring to FIG. 1, a method for forming a novel environmental wood laminate flooring includes processing steps as follows.

A wood veneer layer 2 is provided as a top layer of the flooring. A wear-resistance layer 1 is adhered on a top surface of the wood veneer layer 2, and a layer of glue-soaked paper 3 is pressed on a bottom surface of the wood veneer layer 2. The wood veneer layer 2 which is translucent has a thickness of about 0.1 mm. The glue-soaked paper 3 is dip-dyed into yellow. Beautiful and natural wood lines may be presented clearly due to a combining effect of the glue-soaked paper 3 and the wood veneer layer's natural wood texture. A fiberboard 4 is provided as a base board layer of the flooring. The fiberboard has a thickness of 12 mm, on a bottom surface of which a balancing layer 5 is stacked. The top layer and the base board layer formed above are stacked together and a heat pressing process is performed thereto with a heat pressing machine. The heat pressing process is performed at a temperature of about 175° C. and under a pressure of about 20 Mpa, and the pressure is kept for a period of about 30 seconds. Corresponding tongues and grooves are configured on four lateral faces of the flooring formed, so that a plurality of the floorings may be attached together with the corresponding tongues and grooves.

Exemplary Embodiment 2

Referring to FIG. 1, a method for forming a novel environmental wood laminate flooring includes processing steps as follows.

A wood veneer layer 2 is provided as a top layer of the flooring. A wear-resistance layer 1 is adhered on a top surface of the wood veneer layer 2, and a layer of glue-soaked paper 3 is pressed on a bottom surface of the wood veneer layer 2. The wood veneer layer 2 which is translucent has a thickness of about 0.2 mm. The glue-soaked paper 3 is dip-dyed into light green. Beautiful and natural wood lines may be presented clearly due to a combining effect of the glue-soaked paper 3 and the wood veneer layer's natural wood texture. A fiberboard 4 is provided as a base board layer of the flooring. The fiberboard has a thickness of 15 mm, on a bottom surface of which a balancing layer 5 is stacked. The top layer and the base board layer formed above are stacked together and a heat pressing process is performed thereto with a heat pressing machine. The heat pressing process is performed at a temperature of about 190° C. and under a pressure of about 22 Mpa, and the pressure is kept for a period of about 50 seconds. Corresponding tongues and grooves are configured on four lateral faces of the flooring formed, so that a plurality of the floorings may be attached together with the corresponding tongues and grooves.

Exemplary Embodiment 3

Referring to FIG. 1, a method for forming a novel environmental wood laminate flooring includes processing steps as follows.

A wood veneer layer 2 is provided as a top layer of the flooring. A wear-resistance layer 1 is adhered on a top surface of the wood veneer layer 2, and a layer of glue-soaked paper 3 is pressed on a bottom surface of the wood veneer layer 2. The wood veneer layer 2 which is translucent has a thickness of about 0.3 mm. The glue-soaked paper 3 is dip-dyed into light green. Beautiful and natural wood lines may be presented clearly due to a combining effect of the glue-soaked paper 3 and the wood veneer layer's natural wood texture. A fiberboard 4 is provided as a base board layer of the flooring. The fiberboard has a thickness of 15 mm, on a bottom surface of which a balancing layer 5 is stacked. The top layer and the base board layer formed above are stacked together and a heat pressing process is performed thereto with a heat pressing machine. The heat pressing process is performed at a temperature of about 170° C. and under a pressure of about 16 Mpa, and the pressure is kept for a period of about 20 seconds Corresponding tongues and grooves are configured on four lateral faces of the flooring formed, so that a plurality of the floorings may be attached together with the corresponding tongues and grooves.

The principles, features and advantages of the present disclosure are illustrated and described above. It should be understood for those skilled in the art that the scope of the present disclosure should not be limited by the above exemplary embodiments. Descriptions in the exemplary embodiments and the specification are for purposes of illustration. Modifications and variations may be implanted without departing the spirit and scope of the present disclosure. The true scope of the present disclosure is indicated by the following claims and their equivalents.

What is claimed is:

1. A method for forming a novel environmental wood laminate flooring, comprising:
   step (1): dip-dyeing a layer of glue-soaked paper with different shades of colors;
   step (2): providing a translucent wood veneer layer as a top layer having a top surface and a bottom surface, the top surface of which is adhered with a wear-resistant layer, the bottom surface of which is pressed with the layer of glue-soaked paper to accentuate clear and natural wood lines of the wood veneer layer, wherein the wear-resistant layer, the wood veneer layer and the glue-soaked paper are stacked successively from top to bottom;
   step (3): providing a high density board as a base board layer having a top surface and a bottom surface, wherein the high density board has a thickness ranging from 6 mm to 20 mm, and the bottom surface of which is adhered with a balance layer, wherein the high density board and the balance layer are stacked successively from top to bottom;
   step (4): stacking a stack formed in step (2) and a stack formed in step (3) together, wherein the layer of glue soaked paper and high density board are adjacent each other, and heat pressing the stacks with a heat pressing machine at a temperature ranging from about 170° C. to about 190° C. and under a pressure ranging from about 16 MPa to about 22 MPa, wherein the pressure is kept for a period from 20 s to 50 s, so that a flooring is preliminarily formed; and
   step (5): configuring corresponding tongues and grooves on four lateral faces of the flooring formed in step (4), so that a plurality of the floorings may be attached together with the corresponding tongues and grooves.

2. The method according to claim 1, wherein the heat pressing in step (4) is performed at a temperature of 175° C. under a pressure of 20 MPa, and the pressure is kept for a period of 30 seconds.

3. The method according to claim 1, wherein the wood veneer layer has a thickness ranging from 0.05 mm to 0.3 mm.

* * * * *